(12) United States Patent
Miyakoshi

(10) Patent No.: US 9,990,619 B2
(45) Date of Patent: Jun. 5, 2018

(54) HOLDING MANNER LEARNING APPARATUS, HOLDING MANNER LEARNING SYSTEM AND HOLDING MANNER LEARNING METHOD

(71) Applicant: TOSHIBA TEC KABUSHIKI KAISHA, Shinagawa-ku, Tokyo (JP)

(72) Inventor: Hidehiko Miyakoshi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 14/962,479

(22) Filed: Dec. 8, 2015

(65) Prior Publication Data

US 2016/0196543 A1 Jul. 7, 2016

(30) Foreign Application Priority Data

Jan. 5, 2015 (JP) .................................. 2015-000546

(51) Int. Cl.
*G06K 9/00* (2006.01)
*G06Q 20/20* (2012.01)
(Continued)

(52) U.S. Cl.
CPC ....... *G06Q 20/208* (2013.01); *G06K 9/00624* (2013.01); *G06K 9/46* (2013.01);
(Continued)

(58) Field of Classification Search
None
See application file for complete search history.

(56) References Cited

U.S. PATENT DOCUMENTS

| 2010/0092035 A1 | 4/2010 | Murdter |
| 2010/0217678 A1 | 8/2010 | Goncalves |

(Continued)

FOREIGN PATENT DOCUMENTS

| EP | 1720137 | 11/2006 |
| JP | 2003-173369 | 6/2003 |

(Continued)

OTHER PUBLICATIONS

Extended European Search Report for European Patent Application No. 15202749.6 dated Jun. 20, 2016.
(Continued)

*Primary Examiner* — Nirav G Patel
(74) *Attorney, Agent, or Firm* — Amin, Turocy & Watson LLP

(57) ABSTRACT

A holding-manner learning apparatus includes a storage part and a hardware processor that functions as a designating module, an acquisition module, a calculation module, a storing module, and an output module. The designating module designates a target object from storage storing therein a feature amount for recognizing an object. The acquisition module acquires an image by photographing an object. The calculation module calculates a similarity degree between the feature amount of the object in the image and the feature amount of the target object. The storing module stores, according to the similarity degree calculated, the image and similarity degree in a first table or a second table in an associated manner. The output module outputs an electronic file presenting the image and similarity degree in the first table to indicate a proper holding manner and/or the image and similarity degree in the second table to indicate an improper holding manner.

5 Claims, 15 Drawing Sheets

(51) Int. Cl.
 *G06K 9/46* (2006.01)
 *G06K 9/62* (2006.01)
 *G07G 1/00* (2006.01)
 *G07G 1/12* (2006.01)

(52) U.S. Cl.
 CPC ......... *G06K 9/6253* (2013.01); *G06K 9/6255* (2013.01); *G06K 2209/17* (2013.01); *G07G 1/0063* (2013.01); *G07G 1/12* (2013.01)

(56) References Cited

U.S. PATENT DOCUMENTS

| | | | |
|---|---|---|---|
| 2012/0043375 A1* | 2/2012 | Ueda | G01G 19/4144 235/3 |
| 2013/0057692 A1 | 3/2013 | Naito et al. | |
| 2014/0064569 A1 | 3/2014 | Sugasawa et al. | |
| 2014/0153786 A1 | 6/2014 | Takeno et al. | |
| 2014/0219512 A1 | 8/2014 | Sasaki et al. | |
| 2014/0355838 A1* | 12/2014 | Miyakoshi | |
| 2016/0086148 A1* | 3/2016 | Katsumura | G06Q 20/208 705/23 |
| 2016/0180509 A1 | 6/2016 | Sato | |

FOREIGN PATENT DOCUMENTS

| | | |
|---|---|---|
| JP | 2007-179224 | 7/2007 |
| JP | 2010-198137 | 9/2010 |
| JP | 2013-008103 | 1/2013 |
| JP | 2013-054666 | 3/2013 |
| JP | 2014-153894 | 8/2014 |
| JP | 2016-115282 | 6/2016 |

OTHER PUBLICATIONS

European Office Action for European Patent Application No. 15202749.6 dated Jun. 16, 2017.
Japanese Decision to Grant a Patent for Japanese Patent Application No. 2015-000546 dated Jul. 18, 2017.

* cited by examiner

| COMMODITY ID | COMMODITY CATEGORY | COMMODITY NAME | VARIETIES | UNIT PRICE | ILLUSTRATION IMAGE | FEATURE AMOUNT | GUIDANCE INFORMATION |
|---|---|---|---|---|---|---|---|
| XXXXXXX | VEGETABLES | CARROT | | 100YEN | 🥕 | XXXXXXX | 1, 3 |
| ...... | ...... | ...... | ...... | ...... | ...... | ...... | |
| XXXXXXX | FRUITS | APPLE | FUJI | 100YEN | 🍎 | XXXXXXX | 1, 2 |
| XXXXXXX | FRUITS | APPLE | JONAGOLD | 150YEN | 🍎 | XXXXXXX | 1, 2 |
| XXXXXXX | FRUITS | APPLE | JONAGOLD | 200YEN | 🍎 | XXXXXXX | 1, 2 |
| XXXXXXX | FRUITS | APPLE | KOGYOKU | 250YEN | 🍎 | XXXXXXX | 1, 2 |

FIG.3

HOLDING MANNER LEARNING APPARATUS, HOLDING MANNER LEARNING SYSTEM AND HOLDING MANNER LEARNING METHOD

CROSS-REFERENCE TO RELATED APPLICATION

This application is based upon and claims the benefit of priority from Japanese Patent Application No. 2015-000546, filed Jan. 5, 2015, the entire contents of which are incorporated herein by reference.

FIELD

Embodiments described herein relate generally to an information processing apparatus, a store system and an information processing method.

BACKGROUND

Conventionally, there is a general object recognition (object recognition) technology in which feature amount of a target object extracted from an image data obtained by photographing the object with an image sensor device is compared with data for collation (feature amount) stored in a prepared dictionary to obtain a similarity degree, and the category and the like of the object is recognized (detected) according to the similarity degree. Moreover, a store system in which such a general object recognition technology is applied to the recognition of a commodity such as vegetables and fruits and the sales of the recognized commodity is registered has been proposed.

In the general object recognition described above, the image data obtained by photographing a commodity varies according to the commodity holding manner, such as a surface to which the commodity is held, a position of the commodity, and a distance between an image sensor and the commodity.

Consequently, in some cases, the commodity cannot correctly be recognized according to a commodity holding manner.

BRIEF DESCRIPTION OF THE DRAWINGS

FIG. 3 is a schematic diagram illustrating an example of data constitution of a PLU file;

DETAILED DESCRIPTION

In accordance with an embodiment, an information processing apparatus comprises a designating module, an acquisition module, a calculation module, an updating module and an output module. The designating module designates a target object from a dictionary in which a feature amount for recognizing an object is stored for each object. The acquisition module acquires an image captured by photographing an object that is held over an image capturing section with the image capturing section. The calculation module compares the feature amount of the object contained in the image acquired by the acquisition module with the feature amount of the object designated by the designating module to calculate a similarity degree therebetween. The updating module updates, according to the similarity degree calculated by the calculation module, a list in which the image acquired by the acquisition module and the similarity degree of the object contained in the image are stored in an associated manner. The output module outputs the image and information indicating the similarity degree of the image in the list updated by the updating module.

Hereinafter, the information processing apparatus, the store system and the information processing method according to the present embodiment are described with reference to the accompanying drawings by taking a checkout system as an example. The store system is a checkout system (POS system) equipped with a POS terminal for carrying out sales-registration and settlement of commodities in one transaction. The present embodiment is an example of application to a checkout system introduced to a store such as a supermarket and the like.

Figure 1:
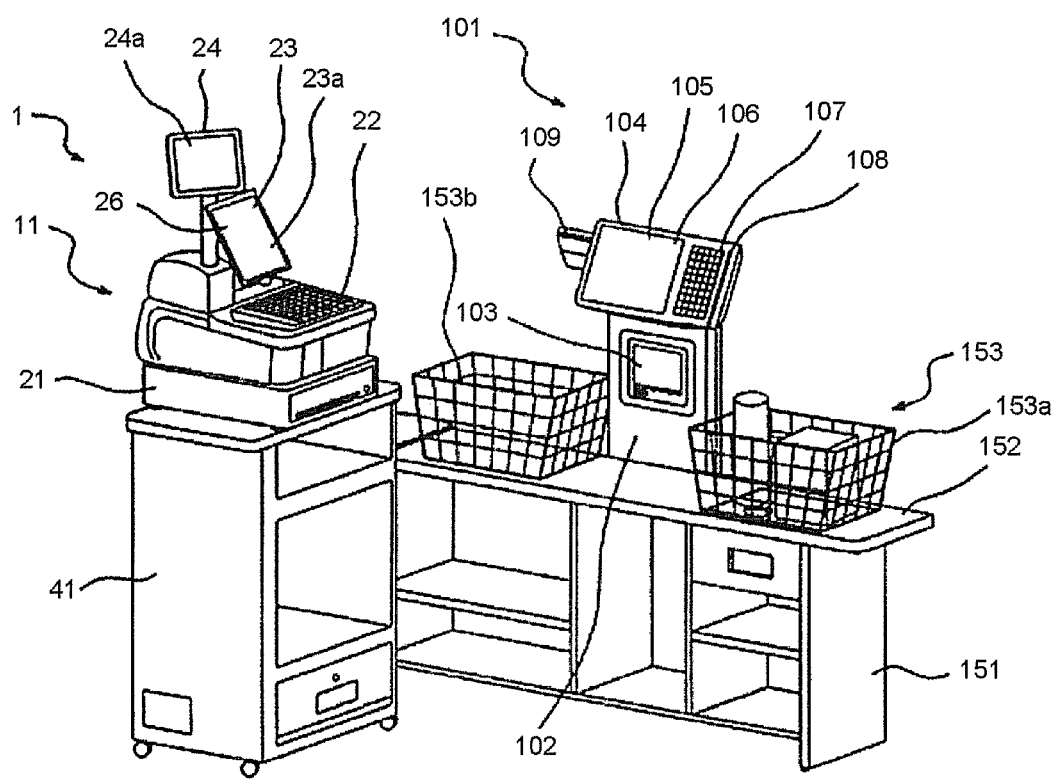
FIG. 1 is a perspective view illustrating an example of a checkout system according to one embodiment.

FIG. 1 is a perspective view illustrating an example of a checkout system 1 according to the embodiment. As shown in FIG. 1, the checkout system 1 includes a commodity reading apparatus 101 for reading information relating to a commodity and a POS terminal 11 for carrying out sales-registration and settlement of commodities in one transaction. Hereinafter, an example in which the POS terminal 11 is applied as the information processing apparatus according to the present embodiment is described.

The POS terminal 11 is placed on a drawer 21 on a checkout counter 41. The drawer 21 is opened or closed under the control of the POS terminal 11. The POS terminal 11 is equipped with a keyboard 22 and a first display device 23. The keyboard 22 is arranged on the upper surface of the POS terminal 11, and includes keys for an operator (shop clerk) to carry out input operation. The first display device 23 for displaying information to the operator is arranged behind the keyboard 22. The first display device 23 is provided with a display surface 23a. A touch panel 26 is laminated on the display surface 23a.

The POS terminal 11 further includes a second display device 24. The second display device 24 is arranged at a backside to the first display device 23 to display information to a customer. Further, the second display device 24 shown in FIG. 1 is in a state in which a display screen 24a thereof faces the operator in FIG. 1. However, the second display device 24 can be rotated such that the display surface 24a is directed to a customer to display information to the customer.

The counter table 151 is a horizontally elongated table and is arranged to be in an L-shape with the checkout counter 41 on which the POS terminal 11 is placed. A receiving surface 152 is formed on the counter table 151. Shopping basket 153 which receives a commodity therein is placed on the receiving surface 152. The shopping basket 153 includes a first shopping basket 153a and a second shopping basket 153b. The first shopping basket 153a is used by the customer to put commodities to be purchased therein, and the second shopping basket 153b is used to put the commodities the sales of which are registered by the commodity reading apparatus 101 therein. The second shopping basket 153b is placed facing the first shopping basket 153a across the commodity reading apparatus 101. The shopping basket 153, which is not limited to a so-called basket shape, may be a tray, a box, a bag and the like.

The commodity reading apparatus 101, which is connected with the POS terminal 11 to be capable of sending and receiving data, is arranged on the receiving surface 152 of the counter table 151. The commodity reading apparatus 101 comprises a thin rectangular-shaped housing 102. A reading window 103 is formed on the front surface of the housing 102. A display and operation section 104 is arranged on the upper portion of the housing 102.

A first display device 106 serving as a display section on the surface of which a touch panel 105 is laminated is arranged on the display and operation section 104. A keyboard 107 is arranged at the right side of the first display device 106. A card scanning slot 108 of a card reader is arranged at the right side of the keyboard 107. A second display device 109 for providing information to a customer, standing opposite to the operator, is arranged at the left backside of the display and operation section 104.

Figure 2:
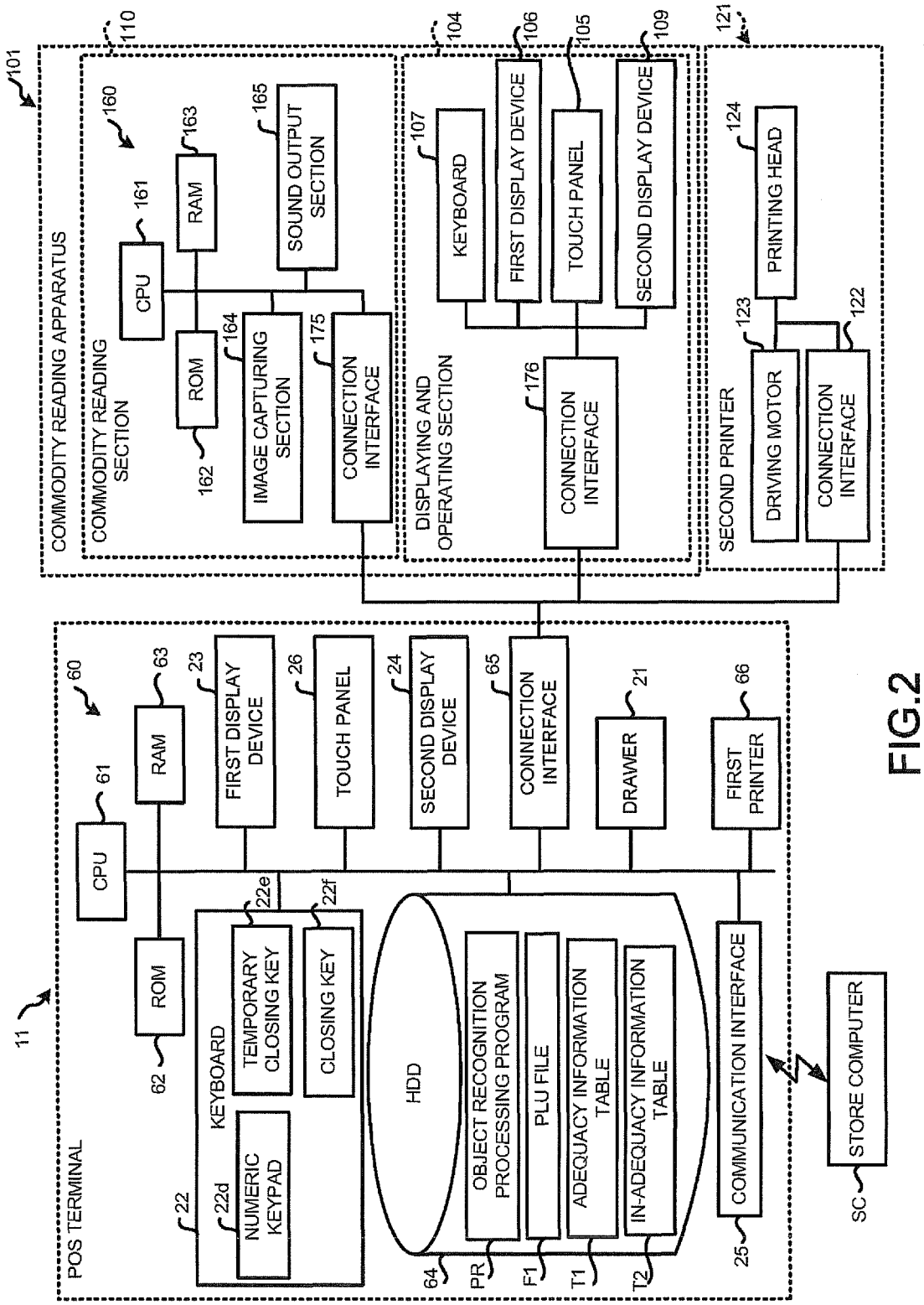
FIG. 2 is block diagram illustrating the hardware constitutions of a POS terminal and a commodity reading apparatus.

Such a commodity reading apparatus 101 includes a commodity reading section 110 (refer to FIG. 2). The commodity reading section 110 is provided with an image capturing section 164 (refer to FIG. 2) at the rear side of the reading window 103.

The operator who operates the commodity reading apparatus 101 moves the commodities placed in the first shopping basket 153a one by one to the second shopping basket 153b. During the movement, the operator enables the commodity to be directed to the reading window 103 of the commodity reading apparatus 101. At this time, the image capturing section 164 (refer to FIG. 2) arranged inside the reading window 103 photographs the commodity.

The commodity reading apparatus 101 notifies the POS terminal 11 of a commodity ID of a commodity to which a sales registration processing is executed. Specifically, the commodity reading apparatus 101 displays a screen for designating which one of commodities stored in a later-described PLU file F1 (refer to FIG. 3) corresponds to the commodity to which the sales registration processing is executed on the display and operation section 104. Then, the commodity reading apparatus 101 notifies the POS terminal 11 of a commodity ID of the designated commodity. In the POS terminal 11, information relating to the sales registration is recorded in a sales master file (not shown) based on the commodity ID notified from the commodity reading apparatus 101 to carry out sales registration. The information relating to the sales registration refers to, for example, the commodity category, commodity name, unit price and the like of the commodity specified with the commodity ID.

FIG. 2 is a block diagram illustrating the hardware constitutions of the POS terminal 11 and the commodity reading apparatus 101. The POS terminal 11 includes a microcomputer 60 serving as an information processing section for executing information processing. The microcomputer 60 is constituted by connecting a ROM (Read Only Memory) 62 and a RAM (Random Access Memory) 63 with a CPU (Central Processing Unit) 61 which executes various kinds of arithmetic processing to control each section of the POS terminal 11 through a bus line.

The drawer 21, the keyboard 22, the first display device 23, the touch panel 26 and the second display device 24 are all connected with the CPU 61 of the POS terminal 11 via various input/output circuits (none is shown). These sections are controlled by the CPU 61.

The keyboard 22 includes numeric keys 22d on which numeric characters and operators are displayed, a temporary closing key 22e and a closing key 22f.

An HDD (Hard Disk Drive) 64 is connected with the CPU 61 of the POS terminal 11. The HDD 64 stores programs and various files. When the POS terminal 11 is started, the programs and the various files stored in the HDD 64 are all or partially developed or copied on the RAM 63 to be executed by the CPU 61.

The HDD 64 includes an object recognition processing program PR, a FLU file F1, an adequacy information table T1 and an in-adequacy information table T2. The HDD 64 may only be a storage device, and may also be a storage device constituted by other storage medium such as an SSD (Solid State Drive).

The object recognition processing program PR is a program having various kinds of functions relating to an object recognition processing.

The PLU file F1 is a commodity file in which information relating to the sales registration of a commodity that is purchased is stored for each of the commodities displayed in the store. In the following description, the PLU file F1 is used as a dictionary; however, the dictionary may be a file different from the PLU file F1. The dictionary stores, for a plurality of commodities, the data for collation (feature amount) used to recognize the commodity extracted from the image data obtained from a captured image. In a case in which the dictionary is a file different from the PLU file F1, data for collation (feature amount) stored in the dictionary is stored in association with information (recognition information) in the PLU file F1. The feature amount is obtained by parameterizing the appearance feature such as a standard shape, surface hue, pattern, concave-convex state and the like of commodity.

FIG. 3 is a schematic diagram illustrating an example of the data arrangement of the PLU file F1. As shown in FIG. 3, the PLU file F1 stores a commodity ID, information relating to a commodity, an illustration image, and feature amount as the commodity information of the commodity for each commodity. The commodity ID is recognition information capable of recognizing a unique commodity. The information relating to a commodity includes, for example, a commodity category the commodity belongs to, a commodity name, a variety, a unit price and the like. The illustration image is an image showing the commodity. The feature amount is information such as the hue, the surface concave-convex state and the like read from the captured commodity image. Further, the feature amount is the data for collation used in the later-described similarity degree determination. The PLU file F1 can be read by the commodity reading apparatus 101 through a later-described connection interface 65.

In addition, as shown in FIG. 3, the PLU file F1 further stores guidance information for each commodity. The guidance information displays the guidance indicating an important point for each feature of an object photographed by the image capturing section 164 when the commodity is held over the image capturing section 164.

For example, the following guidance is listed as the guidance display indicating the important point for each feature of a photographed commodity:

1. Guidance for indicating an image capturing distance to the image capturing section 164, which is commonly applicable to all commodities to be photographed.

2. Guidance for guiding the photographing manner in which the entire object is photographed while turning the object itself around, for a spherical object such as an apple and the like.

3. Guidance for guiding the photographing manner in which the entire object is photographed to obtain an image by moving the object in a longitudinal direction of the object while turning the object itself around by taking the longitudinal direction as an axis, for a long object such as a white radish, leek and the like.

4. Guidance for guiding the photographing manner in which an object is photographed in such a manner that the hand of a shop clerk who holds the object is not imaged in an image captured by the image capturing section 164, for a small object such as a sudachi (Japanese small citrus) and the like.

1 and 3 are set as the guidance information for an object "carrot" shown at the top of FIG. 3.

Figure 4:
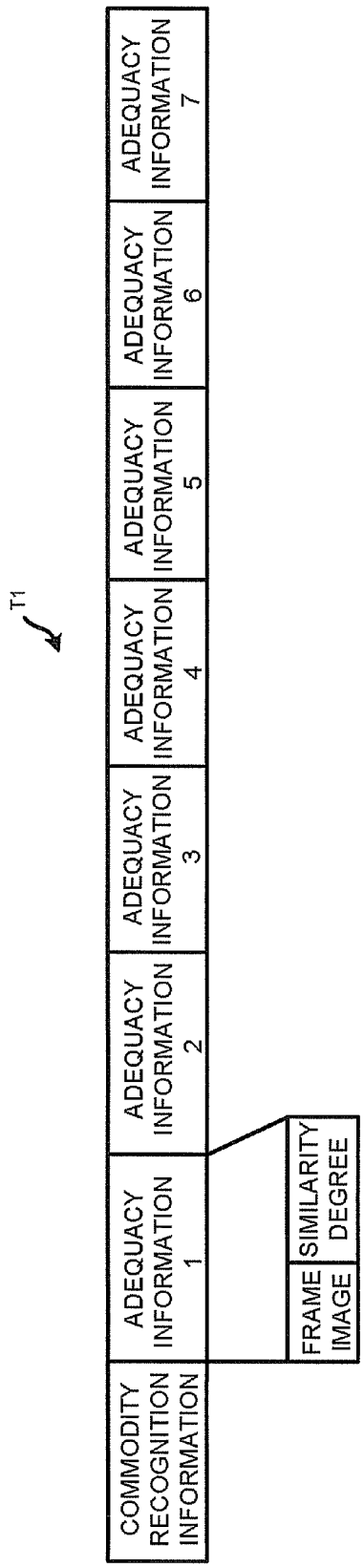
FIG. 4 is a schematic diagram illustrating an example of the data constitution of an adequacy information table.

FIG. 4 is a schematic diagram illustrating an example of the data constitution of an adequacy information table T1. The adequacy information table T1 is a list in which the frame images of which the similarity degrees are high are stored for each commodity. In the adequacy information table T1, commodity recognition information is stored in association with a preset number of the adequacy information. The commodity recognition information is capable of recognizing a commodity. For example, the commodity recognition information is a commodity ID. The adequacy information is information for indicating an appropriate holding manner of the commodity over the image capturing section 164. In the adequacy information, the frame image is stored in association with the similarity degree. Specifically, the frame image refers to the image of a commodity which is captured by the image capturing section 164 with a proper holding manner. The similarity degree is a degree between the feature amount extracted from the frame image associated therewith and the feature amount stored in the PLU file F1. In the adequacy information table T1 shown in FIG. 4, 7 of the adequacy information of which the similarity degrees are high are stored. However, the number of the adequacy information is an example, and may be lower than 6, or greater than 8.

Figure 5:
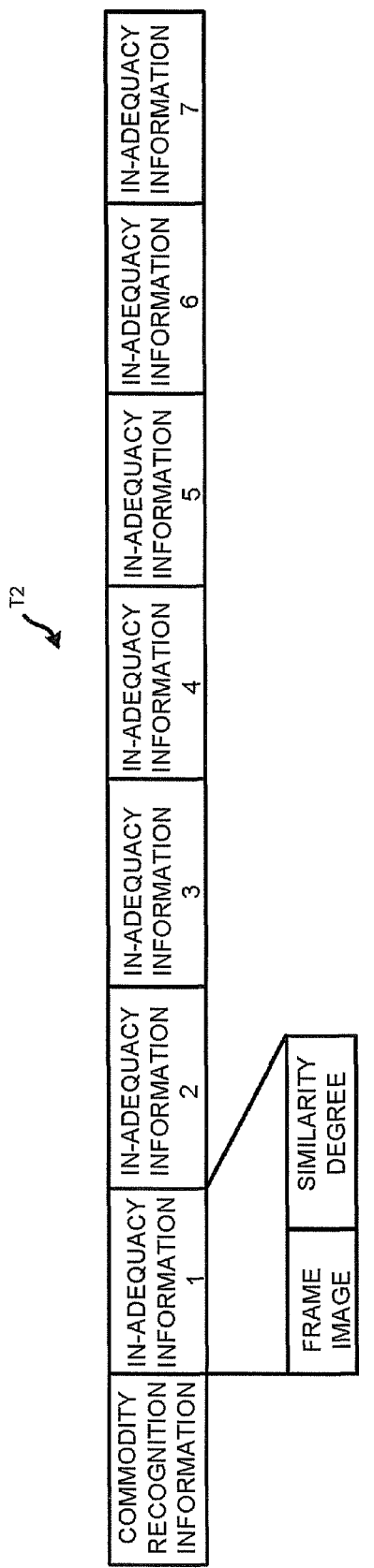
FIG. 5 is a schematic diagram illustrating an example of the data constitution of an in-adequacy information table.

FIG. 5 is a schematic diagram illustrating an example of the data constitution of an in-adequacy information table T2. The in-adequacy information table T2 is a list in which the frame images of which the similarity degrees are low are stored for each commodity. In the in-adequacy information table T2, commodity recognition information is stored in association with a preset number of the in-adequacy information. Similar to the commodity recognition information in the adequacy information table T1 described above, the commodity recognition information is capable of recognizing a commodity. The in-adequacy information is information for indicating an improper holding manner of commodity over the image capturing section 164. Specifically, in the in-adequacy information, the frame image is stored in association with the similarity degree. The frame image refers to the image of a commodity which is captured by the image capturing section 164 with an improper holding manner. The similarity degree is a degree between the feature amount extracted from the frame image associated therewith and the feature amount stored in the PLU file F1. In the in-adequacy information table T2 shown in FIG. 5, 7 of the in-adequacy information of which the similarity degrees are low are stored. However, the number of the in-adequacy information is an example, and may be lower than 6, or greater than 8.

Returning to FIG. 2, a communication interface 25 for executing data communication with a store computer SC is connected with the CPU 61 of the POS terminal 11 through the input/output circuit (not shown). The store computer SC is arranged at a back office and the like in a store. The HDD (not shown) of the store computer SC stores the PLU file F1 to be delivered to the POS terminal 11.

The connection interface 65 which enables the data transmission/reception to/from the commodity reading apparatus 101 is connected with the CPU 61 of the POS terminal 11. The commodity reading apparatus 101 is connected with the connection interface 65. A first printer 66 which carries out printing on a receipt is connected with the CPU 61 of the POS terminal 11. The first printer 66 prints content of one transaction on a receipt under the control of the CPU 61.

The commodity reading apparatus 101 also includes a microcomputer 160. The microcomputer 160 is constituted by connecting a ROM 162 and a RAM 163 with a CPU 161 through a bus line. The ROM 162 stores programs executed by the CPU 161. The image capturing section 164 and a sound output section 165 are connected with the CPU 161 through various input/output circuits (none is shown). The operations of the image capturing section 164 and the sound output section 165 are controlled by the CPU 161.

The display and operation section 104 is connected with the commodity reading section 110 and the POS terminal 11 through a connection interface 176. The operation of the display and operation section 104 is controlled by the CPU 161 of the commodity reading section 110 and the CPU 61 of the POS terminal 11.

The image capturing section 164, which includes a light source such as an LED (not shown) and an image sensor such as a color CCD image sensor or a color CMOS image sensor, carries out an image capturing processing from the inside of the reading window 103 under the control of the CPU 161. For example, images are captured by the image capturing section 164 at 30 fps (Frame Per Second). The frame images (captured images) sequentially captured by the image capturing section 164 at a predetermined frame rate are stored in the RAM 163.

The sound output section 165 includes a sound circuit and a speaker for issuing a preset alarm sound. The sound output section 165 gives a notification with a sound (voice) or an alarm sound under the control of the CPU 161.

Further, the CPU 161 is connected with a connection interface 175. The connection interface 175 is connected with the connection interface 65 of the POS terminal 11 to carry out the data transmission/reception to/from the POS terminal 11. The connection interface 175 carries out data transmission/reception to/from the display and operation section 104 through the connection with the connection interface 176 of the display and operation section 104.

The connection interface 65 can be connected with a second printer 121. The second printer 121, functioning as a printing section, is an image forming device which prints documentation such as documents, image and the like. The second printer 121 is equipped with a connection interface 122, a driving motor 123 and a printing head 124. The connection interface 122 is connected with the connection interface 65 of the POS terminal 11 to carry out transmission/reception of data to/from the POS terminal 11. The driving motor 123 is used to convey the paper to be printed. The printing head 124 prints various data on a paper.

Next, the functional components of the CPU 61 realized by executing programs (object recognition processing program PR) by the CPU 61 are described below.

Figure 6:
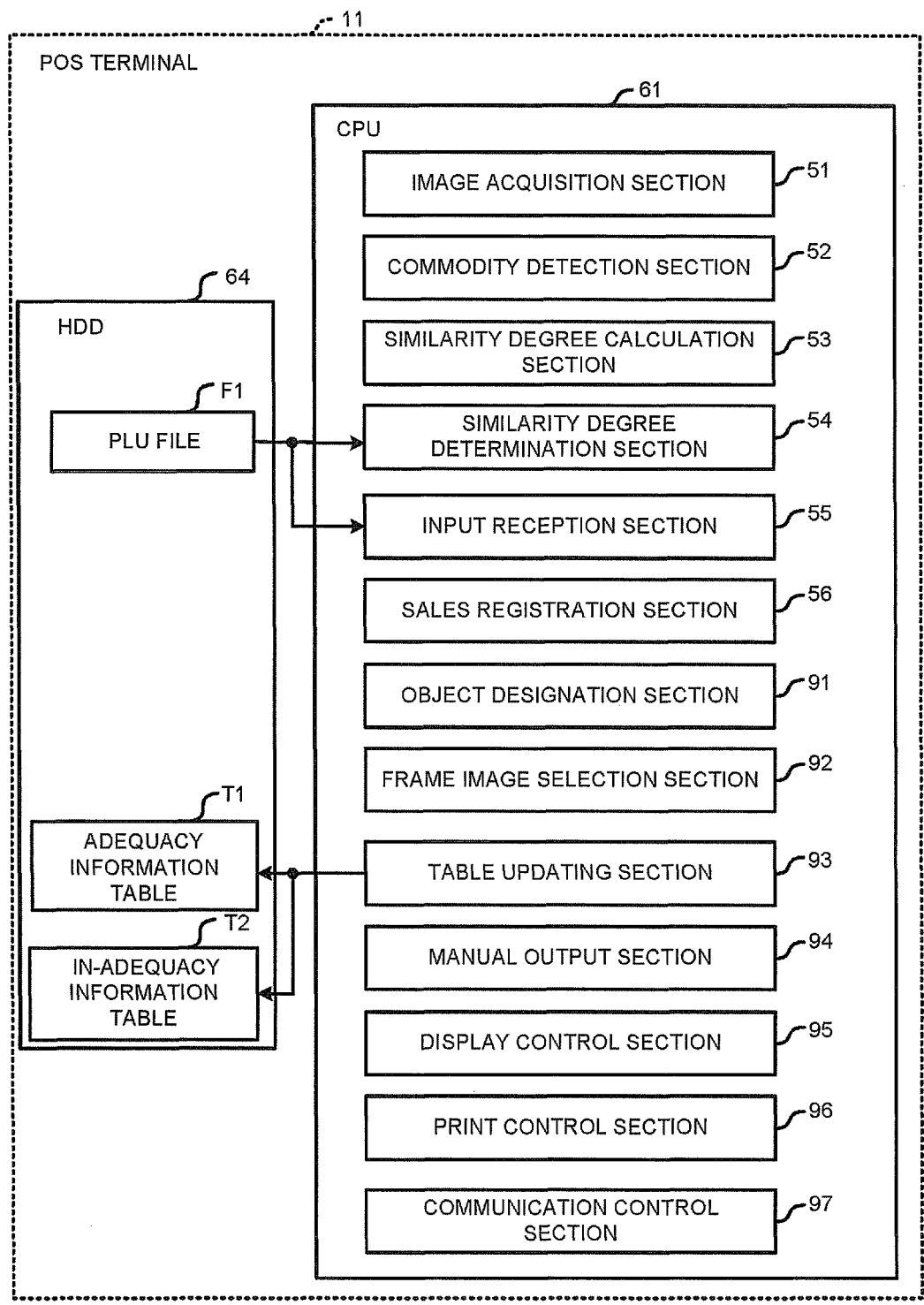
FIG. 6 is a block diagram illustrating the functional components of the POS terminal.

FIG. 6 is a block diagram illustrating the functional components of the POS terminal 11. As shown in FIG. 6, the CPU 61 of the POS terminal 11 functions as an image acquisition section 51, a commodity detection section 52, a similarity degree calculation section 53, a similarity degree determination section 54, an input reception section 55, a sales registration section 56, an object designation section 91, a frame image selection section 92, a table updating section 93, a manual output section 94, a display control section 95, a print control section 96 and a communication control section 97. The CPU 61 of the POS terminal 11 executes a sales registration processing using object recognition and an accuracy check processing for checking the accuracy of the object recognition with the functions described above.

(Sales Registration Processing)

First, a sales registration processing using object recognition is described.

The image acquisition section 51 outputs an image capturing control signal to the image capturing section 164 to enable the image capturing section 164 to start an image capturing operation. In this way, the image capturing section 164 photographs a commodity held over the image capturing section 164. Then, the image capturing section 164 stores the frame images obtained by photographing the object held over the image capturing section 164 in the RAM 163. The image acquisition section 51 serving as an acquisition module sequentially acquires the frame images which are stored in the RAM 163 by the image capturing section 164 after the image capturing operation is started in the order the same as that of storing them to the RAM 163.

Incidentally, in a case in which there is no commodity (object) near the light source of the image capturing section 164, i.e., no commodity (object) near the reading window 103, the image capturing section 164 captures frame images in a state in which the brightness is "0" or nearly "0". If a commodity (object) to be recognized is moved close to the reading window 103 little by little, the brightness of the frame images becomes light because the light from the light source is reflected with the commodity (object).

The image acquisition section 51 detects such a brightness change (change in the attribute of color), and determines that the commodity (object) is in a state that it is held if the brightness value is larger than a predetermined reference value. On the other hand, the image acquisition section 51 determines that the commodity (object) is in a state that it is not held, that is, the commodity (object) is out of frame if the brightness value is smaller than the predetermined reference value.

The commodity detection section 52 detects the whole or part of the commodity contained in the frame images acquired by the image acquisition section 51 through a pattern matching technology. Specifically, the commodity detection section 52 extracts a contour line from the binary image of the acquired frame images. The contour line extracted from the former frame image is compared with the contour line extracted from the current frame image. Then, the commodity detection section 52 recognizes the object of which the contour line is newly extracted as the commodity. In this way, the commodity detection section 52 detects the commodity directed to the reading window 103.

As another method for detecting a commodity, the commodity detection section 52 detects whether or not there is a flesh color area in the acquired frame images. If the flesh color area is detected, in other words, if the hand of a shop clerk is detected, the commodity detection section 52 detects the aforementioned contour line nearby the flesh color area. In this way, the commodity detection section 52 detects the contour line of the commodity that is assumed to be held by the shop clerk. At this time, if a contour line representing the shape of a hand and the contour line of another object nearby the contour line of the hand are detected, the commodity detection section 52 detects the commodity from the contour line of the object.

The similarity degree calculation section 53 extracts the surface state such as the tint, the surface concave-convex state of the commodity from the frame images of the whole or part of the commodity that are captured by the image capturing section 164 as the feature amount. Further, to shorten the processing time, the similarity degree calculation section 53 does not take the contour line and the size of the commodity into consideration.

The similarity degree calculation section 53, serving as a calculation module, respectively compares the feature amount of each commodity registered in the PLU file F1 (hereinafter referred to as a "registered commodity") with the feature amount contained in the frame image to calculate a similarity degree between the commodity and the registered commodity. In a case in which the feature amount of a registered commodity is set to "similarity degree: 1.0"=100%, the similarity degree indicates how much similar the feature amount of the whole or part of the commodity is to that of the registered commodity. For example, in the tint and the surface concave-convex state, the similarity degree calculation section 53 changes the weighting to calculate the similarity degree.

The recognition of an object contained in an image as stated above is referred to as a general object recognition. As to the general object recognition, various recognition technologies are described in the following document.

Keiji Yanai "Present situation and future of generic object recognition", Journal of Information Processing Society, Vol. 48, No. SIG16 [Search on Heisei 22 August 10th], Internet<URL: http://mm.cs.uec.ac.jp/IPSJ-TCVIM-Yanai.pdf>

In addition, the technology carrying out the general object recognition by performing an area-division on the image for each object is described in the following document.

Jamie Shotton etc, "Semantic Texton Forests for Image Categorization and Segmentation", [Search on Heisei 22 August 10th], Internet <URL: http://citeseerx.ist.psu.edu/viewdoc/download?doi=10.1.1.145.3036&rep=rep1&type=pdf>

It is noted that no limitation is given to the method for calculating the similarity degree between the feature amount of commodity extracted from the frame image obtained by photographing the commodity and the feature amount of the registered commodity. For example, the similarity degree therebetween can be calculated as an absolute evaluation or a relative evaluation.

First, a case of calculating the similarity degree as an absolute evaluation is described. The similarity degree calculation section 53 compares the feature amount of commodity extracted from the frame image with the feature amount of each registered commodity one by one. In this way, the similarity degree is calculated as the absolute evaluation.

Next, a case of calculating the similarity degree as a relative value is described. The similarity degree calculation section 53 compares the feature amount of commodity extracted from the frame image with the feature amounts of the registered commodities. At this time, the similarity degree calculation section 53 calculates the similarity degree in a manner of making the sum of the similarity degrees between feature amount of commodity extracted from the frame image and the feature amount of each registered commodity become 1.0 (100%). In this way, the similarity degree calculation section 53 calculates the similarity degree as the relative evaluation.

The similarity degree determination section 54 determines whether or not the similarity degree calculated by the similarity degree calculation section 53 is greater than a predetermined threshold value. In this way, the similarity degree determination section 54 determines that the sales registration method for the commodity photographed by the image capturing section 164 is classified into which one of the automatic registration, a commodity candidate indication and no commodity candidate.

In a case in which there is a registered commodity of which the similarity degree is greater than a first threshold value (hereinafter referred to as a "confirmed commodity"), the similarity degree determination section 54 determines that the commodity photographed by the image capturing section 164 is registered through the automatic registration. Since the probability that the registered commodity described above is the commodity photographed by the image capturing section 164 is high, the automatic registration carries out a processing in which the confirmed commodity is automatically registered without a confirmation operation by an operator.

In a case in which there is no confirmed commodity, but a registered commodity of which the similarity degree is greater than a second threshold value but not greater than the first threshold value (hereinafter referred to as a "commodity candidate"), the similarity degree determination section 54 determines that the commodity photographed by the image capturing section 164 is registered through a commodity candidate indication. The commodity candidate indication carries out a processing in which a commodity candidate serving as a candidate for the commodity contained in the frame image captured by the image capturing section 164 is indicated, and is registered through the confirmation operation by the operator. The number of the commodity candidates may be one or more than one.

In a case in which there is no registered commodity of which the similarity degree is greater than the second threshold value in the PLU file F1, the similarity degree determination section determines that there is no commodity candidate corresponding to the commodity photographed by the image capturing section 164. The 'no commodity candidate' indicates that the commodity photographed by the image capturing section 164 cannot be recognized. This is because that there only exists a registered commodity of which the similarity degree calculated by the similarity degree calculation section 53 is below the second threshold value.

The input reception section 55 receives operations through an input section such as the keyboard 22 or the touch panel 26. More specifically, the input reception section 55 receives operations relating to a sales registration. For example, the input reception section 55 receives an operation for selecting a commodity to be registered from the commodity candidates presented by the similarity degree determination section 54. The input reception section 55 may receive operations from an input section other than the keyboard 22 or the touch panel 26. For example, the input section may be the keyboard 107 of the commodity reading apparatus 101, or the touch panel 105.

The sales registration section 56 records the selected commodity in the sales master file to register it. Specifically, the sales registration section 56 records the commodity ID of the selected commodity and information relating to the sales registration, and the sales volume in the sales master file with reference to the FLU file F1.

(Reading Accuracy Check Processing)

Next, a reading accuracy check processing executed by the CPU 61 of the POS terminal 11 of the embodiment described above according to the object recognition processing program PR is described. The reading accuracy check processing is a processing for notifying the operator of the judgment of propriety (good/bad) of a commodity holding manner by checking a reading accuracy of the commodity held over the image capturing section 164.

The object designation section 91, functioning as a designating module, selects a target commodity to which a reading accuracy check processing is executed from the PLU file F1 serving as a prepared dictionary in advance. The object designation section 91 designates the target commodity selected from the registered commodities stored in the PLU file F1 to be a target commodity to which the reading accuracy check processing is executed.

The frame image selection section 92 selects a frame image of registration candidate that is registered in the adequacy information table T1 or the in-adequacy information table T2 from a plurality of frame images captured by the image capturing section 164. For example, the image capturing section 164 captures frame images at a frame rate of 30 fps. Thus, just before and just after the frame image of which the similarity degree is highest are also high because the commodity holding manners of these frame images are almost the same. Thus, if the frame image having the highest similarity degree is compared with the frame images just before and just after the frame image having the highest similarity degree, there is almost no difference between the contents in such frame images described above. Consequently, nearly the same frame images are stored in the adequacy information table T1. As to the in-adequacy information table T2, the similar matter also occurs. Thus, the frame image selection section 92 selects a frame image to be a registration candidate from the plurality of frame images captured by the image capturing section 164, thus preventing nearly the same frame images from being stored.

Within a preset setting time, the frame image selection section 92 selects the frame image having the highest similarity degree from the plurality of frame images captured by the image capturing section 164 as the frame image of registration candidate.

A method of selecting the frame image by the frame image selection section 92 is not limited to that described above. For example, in a case in which the image capturing section 164 captures a preset number of frame images, the frame image selection section 92 may select a frame image having the highest similarity degree from the plurality of captured frame images as the frame image of registration candidate. Alternatively, the frame image selection section 92 may select a frame image captured just after the preset setting time elapses as the frame image of registration candidate. Alternatively, the frame image selection section 92 may select a frame image captured just after the preset number of frame images are captured as the frame image of registration candidate.

The table updating section 93 serving as an updating module updates the adequacy information table T1 and the in-adequacy information table T2. The table updating section 93 updates the adequacy information table T1 or the in-adequacy information table T2 depending on the similarity degree calculated from the frame image selected by the frame image selection section 92.

The feature amounts for recognizing commodities are stored in the PLU file F1. Thus, the proper commodity holding manner over the image capturing section 164 enables the image capturing section 164 to capture a frame image from which a feature amount approximate to that of the target commodity, stored in the PLU file F1, to which the reading accuracy check processing is executed can be extracted. Thus, in a case in which the similarity degree between the feature amount of the target commodity stored in the PLU file F1 and the feature amount of the frame image of the registration candidate is high, it can be determined that the frame image of the registration candidate is captured in a proper holding manner. Similarly, in a case in which the similarity therebetween is low, it can be determined that the frame image of the registration candidate is captured in an improper holding manner. Consequently, if the similarity degree is high, the table updating section 93 registers the frame image of the registration candidate and the similarity degree thereof in the adequacy information table T1. On the other hand, if the similarity degree is low, the table updating section 93 registers the frame image of the registration candidate and the similarity degree thereof in the in-adequacy information table T2.

Specifically, the table updating section 93 determines whether or not the similarity degree calculated according to the frame image is higher than the lowest similarity degree stored in the adequacy information table T1. If the similarity degree calculated according to the frame image is higher, the table updating section 93 stores the frame image captured by the image capturing section 164 in association with the similarity degree of the frame image in the adequacy information table T1. Moreover, the table updating section 93 deletes the adequacy information of the lowest similarity degree stored in the adequacy information table T1.

Further, the table updating section 93 does not have the preset number of adequacy information in the adequacy information table T1 just after the accuracy check processing is started. In this case, regardless of high or low of the similarity degree calculated according to the frame image, the table updating section 93 stores a frame image captured by the image capturing section 164 in association with the similarity degree thereof in the adequacy information table T1.

On the contrary, the table updating section 93 determines whether or not the similarity degree calculated according to the frame image is lower than the highest similarity degree stored in the in-adequacy information table T2. If the similarity degree calculated according to the frame image is lower, the table updating section 93 stores the frame image captured by the image capturing section 164 in association with the similarity degree thereof in the in-adequacy information table T2. Moreover, the table updating section 93 deletes the in-adequacy information of the highest similarity degree stored in the in-adequacy information table T2. The table updating section 93 does not have the preset number of in-adequacy information in the in-adequacy information table T2 just after the accuracy check processing is started. In this case, regardless of high or low of the similarity degree calculated according to the frame image, the table updating section 93 stores a frame image captured by the image capturing section 164 in association with the similarity degree thereof in the in-adequacy information table T2.

The manual output section 94, serving as an output module, outputs a holding manner manual in which a commodity holding manner for each commodity over the image capturing section 164 is presented. The holding manner manual is an electric file used to present the adequacy information stored in the adequacy information table T1 or the in-adequacy information stored in the in-adequacy information table T2 as an example of the commodity holding manner over the image capturing section 164. More specifically, the manual output section 94 stores the holding manner manual in a document file format in the HDD 64. However, the file format of the holding manner manual is not limited to the document file. For example, the file format of the holding manner manual may be an image file format. Further, the manual output section 94 may also store the holding manner manual in a storage medium other than the HDD 64.

At the time the manual output section 94 outputs the holding manner manual, a designation on a target commodity of which the holding manner manual is to be output can be received. Through the manual output section 94, an operator selects a target commodity from the commodities stored in the adequacy information table T1 or stored in the in-adequacy information table T2. Further, the number of the target commodities may be one, or more than one. Furthermore, as long as the manual output section 94 presents at least either the adequacy information stored in the adequacy information table T1 or the in-adequacy information stored in the in-adequacy information table T2, the target commodity can be selected.

The display control section 95 controls to display a screen on a display section such as the first display device 23, the second display device 24, the first display device 106 or the second display device 109. The display control section 95, serving as an output module, displays the adequacy information stored in the adequacy information table T1 or the in-adequacy information stored in the in-adequacy information table T2 on the display section. Further specifically, the display control section 95 displays a list of the adequacy information and the in-adequacy information on the display section. Alternatively, the display control section 95 displays an enlarged screen of the adequacy information and the in-adequacy information on the display section. In a case in which the table updating section 93 updates the adequacy information table T1 and the in-adequacy information table T2, the display control section 95 displays the updated adequacy information and in-adequacy information on the display section.

Further, the display control section 95 displays the holding manner manual output by the manual output section 94 on the display section.

The print control section 96 controls the second printer 121. For example, the print control section 96 serving as an output module enables the second printer 121 to print the holding manner manual output by the manual output section 94.

The communication control section 97 controls the communication interface 25. For example, the communication control section 97 sends the holding manner manual output by the manual output section 94 via the communication interface 25 to the store computer SC. The sending destination is not limited to the store computer SC, but the communication control section 97 may send the holding manner manual to other devices.

Next, the reading accuracy check processing executed by the CPU 61 of the POS terminal 11 of the embodiment described above according to the object recognition processing program PR is described.

Figure 7:
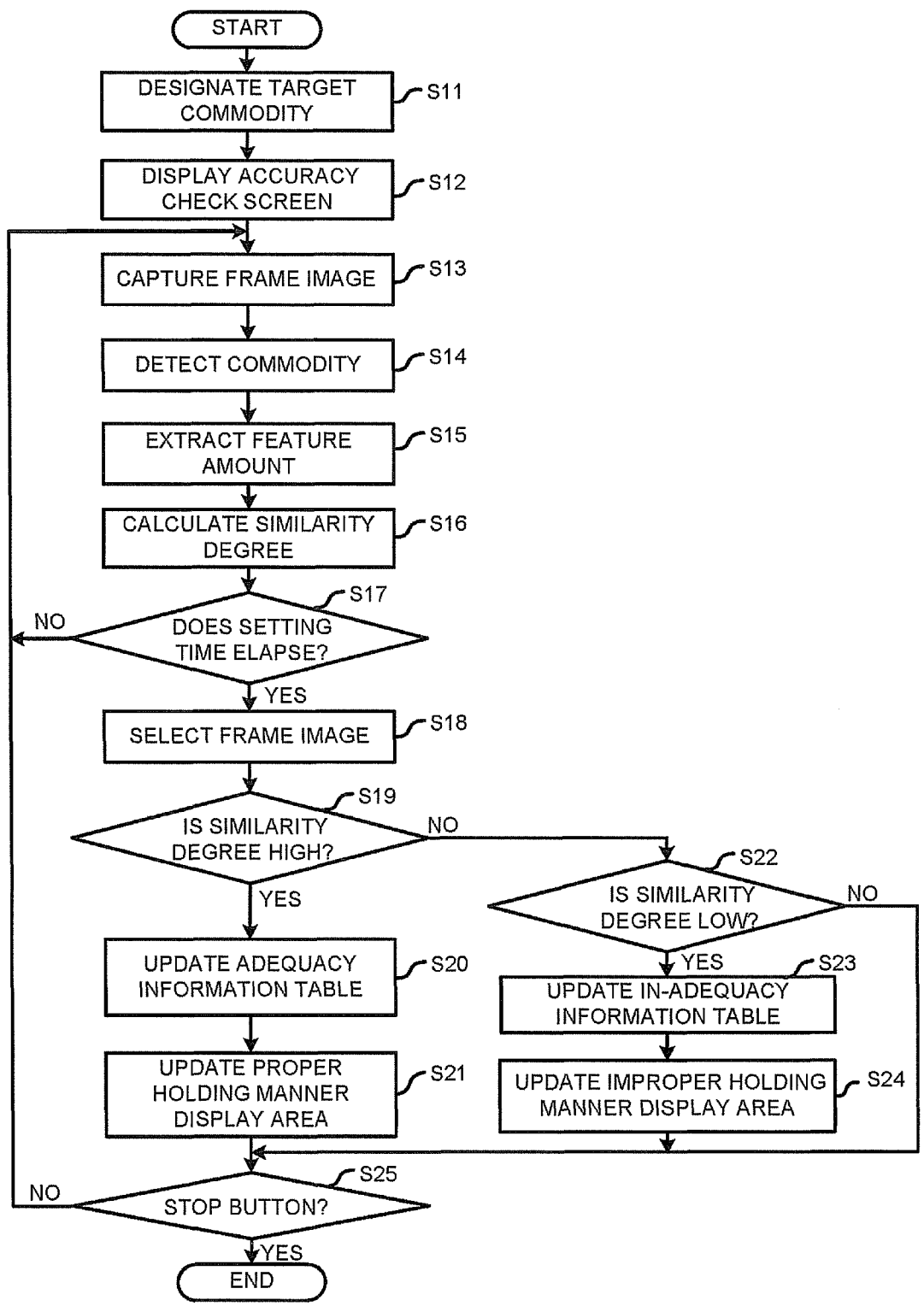
FIG. 7 is a flowchart illustrating a reading accuracy check processing.

FIG. 7 is a flowchart illustrating the reading accuracy check processing executed by the CPU 61 of the POS terminal 11 according to the object recognition processing program PR.

First, the object designation section 91 of the POS terminal 11 designates a registered commodity selected from a list of registered commodities displayed on a commodity list screen (not shown) to be a target commodity to which the reading accuracy check processing is executed (ACT S11). The commodity list screen displays a list of registered commodities stored in the PLU file F1 to designate a target commodity to which a reading accuracy check processing is executed.

Figure 8:
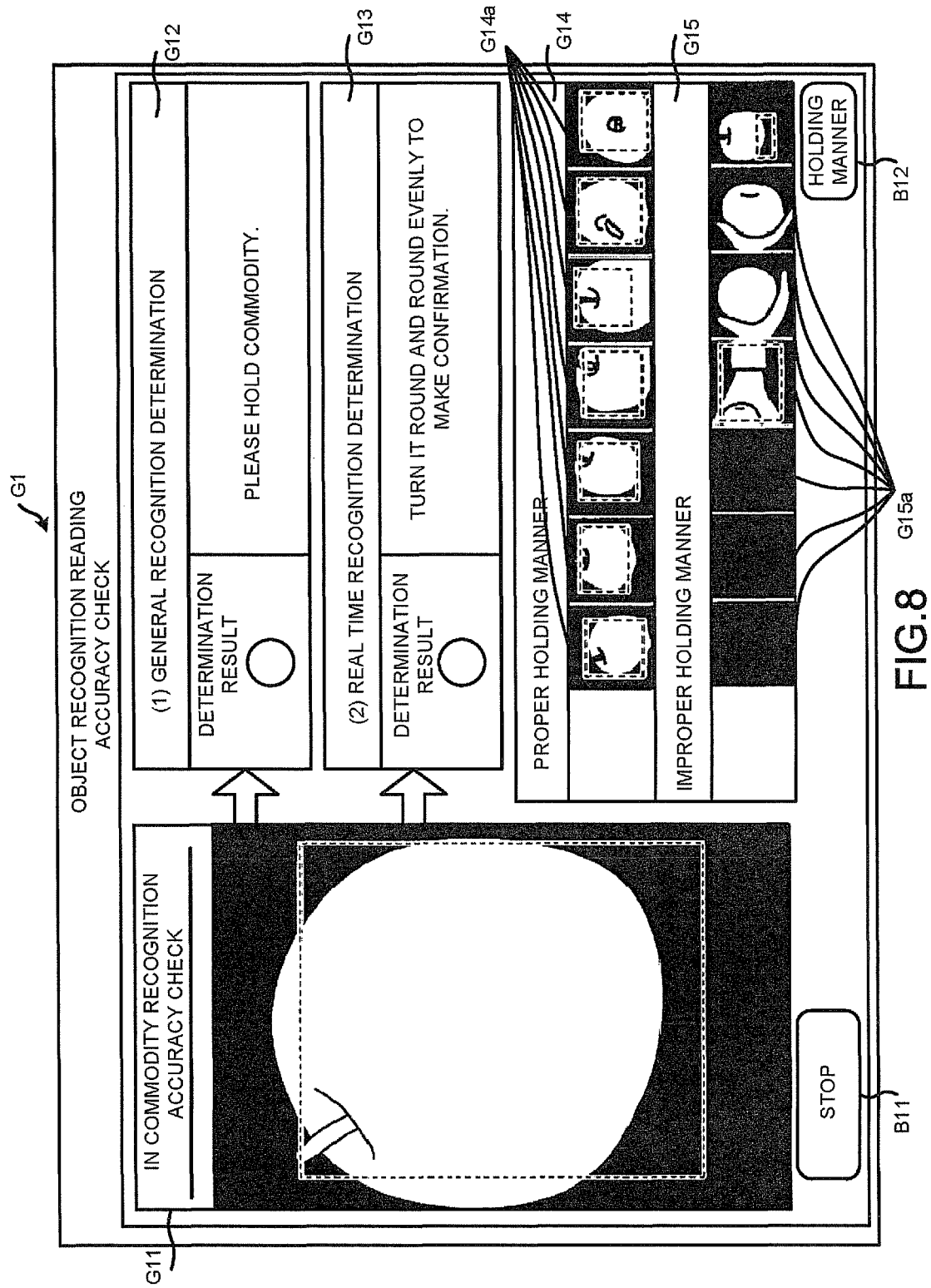
FIG. 8 is an illustration diagram illustrating an example of an accuracy check screen.

Next, the display control section 95 of the POS terminal 11 displays an accuracy check screen G1 (ACT S12). FIG. 8 is a diagram illustrating an example of the accuracy check screen G1. The accuracy check screen G1 is used to display accuracy check results. The accuracy check screen G1 roughly comprises a frame image display area G11, a general recognition determination area G12, a real-time recognition determination area G13, a proper holding manner display area G14, an improper holding manner display area G15, a stop button B11 and a holding manner button B12.

The frame image display area G11 displays a frame image captured by the image capturing section 164. The general recognition determination area G12 displays an accuracy check result in a general object recognition processing. The general recognition determination area G12 displays accuracy check results for a plurality of frame images. The general recognition determination area G12 includes a determination result area and a message display area. The determination result area displays a determination result. The message display area displays a message in a commodity recognition accuracy check processing. The message display area shown in FIG. 8 displays a message "please hold the commodity". The real-time recognition determination area G13 displays a real-time accuracy check result in the object recognition processing. The real-time recognition determination area G13 displays an accuracy check result in single frame image. Further, the real-time recognition determination area G13 may display accuracy check results in a plurality of frame images as long as the real-time is satisfied.

The accuracy check screen G1 displays propriety (good/bat) of the holding manner over the image capturing section 164 in a recognizable manner in the proper holding manner display area G14 and the improper holding manner display area G15 correspondingly depending on the similarity degree of the frame image. As an example of a proper commodity holding manner over the image capturing section 164, the proper holding manner display area G14 displays frame images G14a and information indicating the similarity degrees of the frame images G14a. The proper holding manner display area G14 displays the frame images G14a stored in the proper information table T1. The information indicating the similarity degrees of the frame images G14a in the proper holding manner display area G14 refers to a message "proper holding manner". If the similarity degrees are high, the table updating section 93 determines that the corresponding frame images are captured in the proper holding manner, and stores them in the proper information table T1. Thus, the proper holding manner display area G14 displays a message "proper holding manner" to clearly indicate that the similarity degrees of the frame images G14a are high. Further, the proper holding manner display area G14 displays the frame images G14a in a descending order of the similarity degrees from the left side to the right side. The proper holding manner display area G14 may display the frame images G14a in an ascending order of the similarity degrees from the left side to the right side, or may display the frame images G14a in a random order.

As an example of an improper commodity holding manner over the image capturing section 164, the improper holding manner display area G15 displays frame images G15a and information indicating the similarity degrees of the frame images G15a. The improper holding manner display area G15 displays the frame images G15a stored in the in-adequacy information table T2. The information indicating the similarity degrees of the frame images G15a in the improper holding manner display area G15 refers to a message "improper holding manner". If the similarity degrees are low, the table updating section 93 determines that the corresponding frame images are captured in the improper holding manner, and stores them in the in-adequacy holding information table T2. Thus, the improper holding manner display area G15 displays a message "improper holding manner" to clearly indicate that the similarity degrees of the frame images G15a are low. Further, the improper holding manner display area G15 displays the frame images G15a in an ascending order of the similarity degrees from the left side to the right side. The improper holding manner display area G15 may display the frame images G15a in a descending order of the similarity degrees from the left side to the right side, or may display the frame images G15a in a random order.

The stop button B11 is pressed if the reading accuracy check processing is stopped. The holding manner button B12 is pressed to display a list of enlarged frame images G14a and G15a respectively displayed in the proper holding manner display area G14 and the improper holding manner display area G15.

Next, the image acquisition section 51 of the POS terminal 11 enables the image capturing section 164 to capture an image of a commodity held over the image capturing section 164 (ACT S13). Next, the commodity detection section 52 of the POS terminal 11 detects the commodity held over the image capturing section 164 according to a frame image captured by the image capturing section 164 (ACT S14). Sequentially, the similarity degree calculation section 53 of the POS terminal 11 extracts feature amount of the object contained in the frame image (ACT S15). Then the similarity degree determination section 54 of the POS terminal 11 calculates the similarity degree of the object contained in the frame image (ACT S16).

Next, the frame image selection section 92 of the POS terminal 11 determines whether or not a setting time elapses from the start of the image capturing operation of the image capturing section 164 (ACT S17). If the setting time does not elapse from the start of the image capturing operation of the image capturing section 164, the CPU 61 of the POS terminal 11 proceeds to carry out the processing in ACT S13.

On the other hand, if the setting time elapses from the start of the image capturing operation of the image capturing section 164, the frame image selection section 92 of the POS terminal 11 selects a frame image of registration candidate (ACT S18).

Next, the table updating section 93 of the POS terminal 11 determines whether or not the similarity degree calculated according to the frame image of registration candidate is higher than the lowest similarity degree stored in the adequacy information table T1 (ACT S19). If the calculated similarity degree is higher than the lowest similarity degree in the adequacy information table T1 (YES in ACT S19), the table updating section 93 of the POS terminal 11 updates the adequacy information table T1 (ACT S20). Specifically, the table updating section 93 stores the frame image of registration candidate and the similarity degree calculated according to the frame image of registration candidate in the adequacy information table T1 as adequacy information.

Next, the display control section 95 of the POS terminal 11 updates the display of the proper holding manner display area G14 (ACT S21). The display control section 95 displays the frame images stored in the adequacy information table T1 in the proper holding manner display area G14.

On the other hand, if the calculated similarity degree is lower than the lowest similarity degree in the adequacy information table T1 (NO in ACT S19), the table updating section 93 of the POS terminal 11 determines whether or not the similarity degree calculated according to the frame image of registration candidate is lower than the highest similarity degree stored in the in-adequacy information table T2 (ACT S22). If the calculated similarity degree is higher than the highest similarity degree in the in-adequacy information table T2 (NO in ACT S22), the CPU 61 of the POS terminal 11 proceeds to carry out the processing in ACT S25.

If the calculated similarity degree is lower than the highest similarity degree in the in-adequacy information table T2 (YES in ACT S22), the table updating section 93 of the POS terminal 11 updates the in-adequacy information table T2 (ACT S23). Specifically, the table updating section 93 stores the frame image of registration candidate and the similarity degree calculated according to the frame image thereof in the in-adequacy information table T2 as the in-adequacy information.

Next, the display control section 95 of the POS terminal 11 updates the display of the improper holding manner display area G15 (ACT S24). The display control section 95 displays the frame images stored in the in-adequacy information table T2 in the improper holding manner display area G15.

Next, the input reception section 55 of the POS terminal 11 determines whether or not the press on the stop button B11 is detected (ACT S25). If it is not detected that the stop button B11 is pressed (NO in ACT S25), the CPU 61 of the POS terminal 11 proceeds to carry out the processing in ACT S13.

On the other hand, if it is detected that the stop button B11 is pressed (YES in ACT S25), the CPU 61 of the POS terminal 11 terminates the reading accuracy check processing.

Next, a frame image display processing executed by the CPU 61 of the POS terminal 11 of the embodiment described above according to the object recognition processing program PR is described. The frame image display processing refers to a processing for displaying the frame images stored in the adequacy information table T1 or in the in-adequacy information table T2. The frame image display processing displays the frame images obtained by photographing the commodity which is held over the image capturing section 164 in a proper holding manner or in an in-adequacy holding manner.

Figure 9:
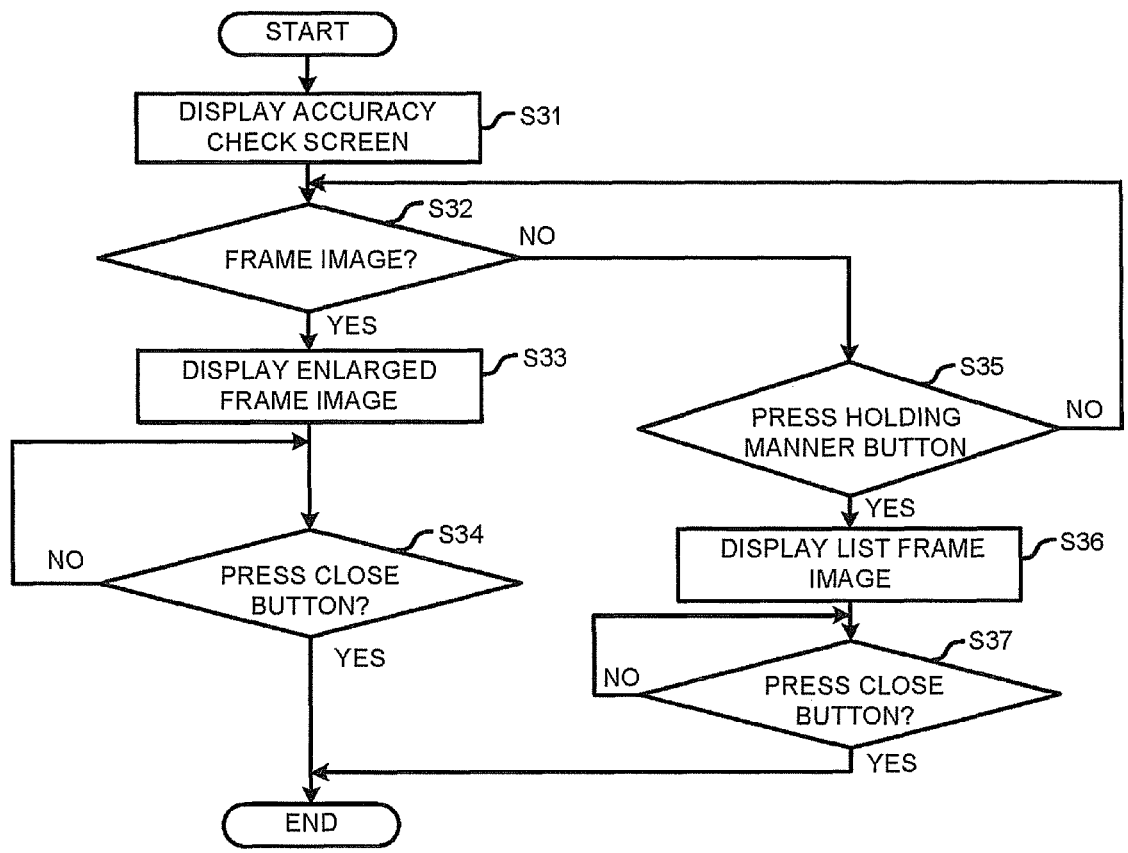
FIG. 9 is a flowchart illustrating a frame image display processing.

FIG. 9 is a flowchart illustrating the frame image display processing executed by the CPU 61 of the POS terminal 11 according to the object recognition processing program PR. The flowchart shown in FIG. 9 is started from a state in which the accuracy check screen G1 is displayed.

First, the display control section 95 of the POS terminal 11 displays the accuracy check screen G1 (ACT S31).

Next, the input reception section 55 of the POS terminal 11 determines whether or not an operation for selecting a frame image G14a or a frame image G15a is detected (ACT S32). Further specifically, the input reception section 55 determines whether or not an operation for selecting one of the frame images G14a displayed in the proper holding manner display area G14 is detected. Alternatively, the input reception section 55 determines whether or not an operation for selecting one of the frame images G15a displayed in the improper holding manner display area G15 is detected.

If the operation for selecting the frame image G14a or a frame image G15a is detected (YES in ACT S32), the display control section 95 of the POS terminal 11 displays an enlarged frame image G2 (ACT S33). The display control section 95 displays the frame image G2 obtained by enlarging the selected frame image G14a or frame image G15a.

Figure 10:
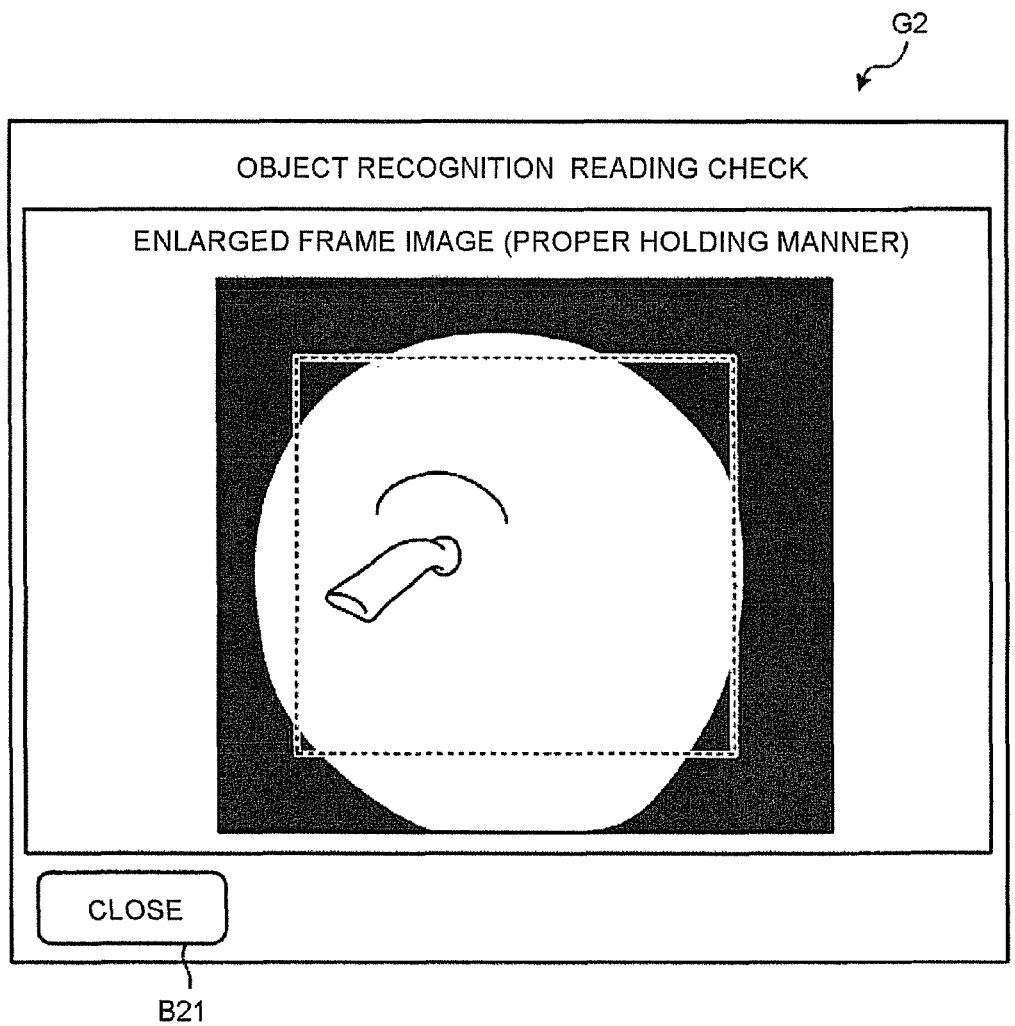
FIG. 10 is an illustration diagram illustrating an example of an enlarged frame image.

FIG. 10 is a diagram illustrating an example of the enlarged frame image G2. The operator can confirm the proper holding manner or the improper holding manner of a commodity held over the image capturing section 164 with reference to the enlarged frame image G2. The enlarged frame image G2 includes a close button B21. The close button B21 is to be pressed if the enlarged frame image G2 is closed. The enlarged frame image G2 displays either the proper holding manner or the improper holding manner as information indicating the similarity degree. The enlarged frame image G2 shown in FIG. 10 displays the proper holding manner as information indicating the similarity degree.

Next, the input reception section 55 of the POS terminal 11 determines whether or not the press of the close button B21 is detected (ACT S34). If it is not detected that the close button B21 is pressed (NO in ACT S34), the display control section 95 of the POS terminal 11 keeps displaying the enlarged frame image G2.

On the other hand, if it is detected that the close button B21 is pressed (YES in ACT S34), the display control section 95 of the POS terminal 11 closes the enlarged frame image G2 to terminate the frame image display processing.

If an operation for selecting the frame image G14a or frame image G15a is not detected (NO in ACT S32), the input reception section 55 of the POS terminal 11 determines whether or not the press of the holding manner button B12 is detected (ACT S35) If it is not detected that the holding manner button B12 is pressed (NO in ACT S35), the CPU 61 of the POS terminal 11 proceeds to carry out the processing in ACT S32.

On the other hand, if it is detected that the holding manner button B12 is pressed (YES in ACT S35), the display control section 95 of the POS terminal 11 displays a listed frame image G3 (ACT S36).

Figure 11:
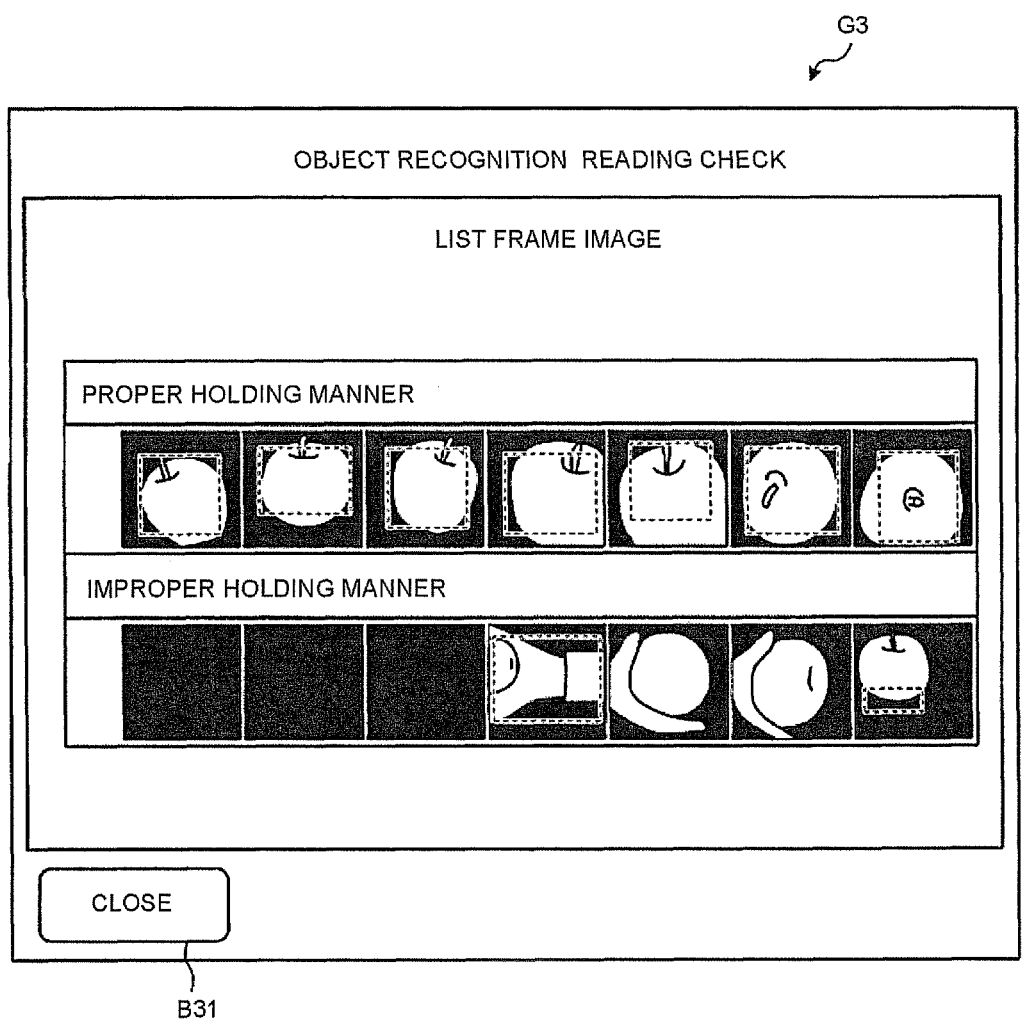
FIG. 11 is an illustration diagram illustrating an example of a frame-list image.

FIG. 11 is a diagram illustrating an example of the listed frame image G3. The listed frame image G3 is a screen on which a list of the frame images G14a in the proper holding manner display area G14 and the frame images G15a in the improper holding manner display area G15 is displayed. The listed frame image G3 is a screen for displaying the frame images stored in the adequacy information table T1 and the frame images stored in the in-adequacy information table T2. The listed frame image G3 displays information indicating the similarity degree in both the proper holding manner display area G14 and the improper holding manner display area G15. The listed frame image G3 includes a close button B31. The close button B31 is to be pressed if the listed frame image G3 is closed. The listed frame image G3 displays a list of the frame images G14a captured in the proper holding manner and the frame images G15a captured in the improper holding manner. As a result, the operator can grasp a tendency of the proper holding manner and a tendency of the improper holding manner.

Next, the input reception section 55 of the POS terminal 11 determines whether or not the press of the close button B31 is detected (ACT S37). If it is not detected that the close button B31 is pressed (NO in ACT S37), the display control section 95 of the POS terminal 11 keeps displaying the listed frame image G3.

On the other hand, if it is detected that the close button B31 is pressed (YES in ACT S37), the display control section 95 of the POS terminal 11 closes the listed frame image G3 to terminate the frame image display processing.

Next, a manual output processing executed by the CPU 61 of the POS terminal 11 of the embodiment described above according to the object recognition processing program PR is described. The manual output processing is a processing for outputting a holding manner manual in which the frame images stored in the adequacy information table T1 or the frame images stored in the in-adequacy information table T2 are presented for each commodity.

Figure 12:
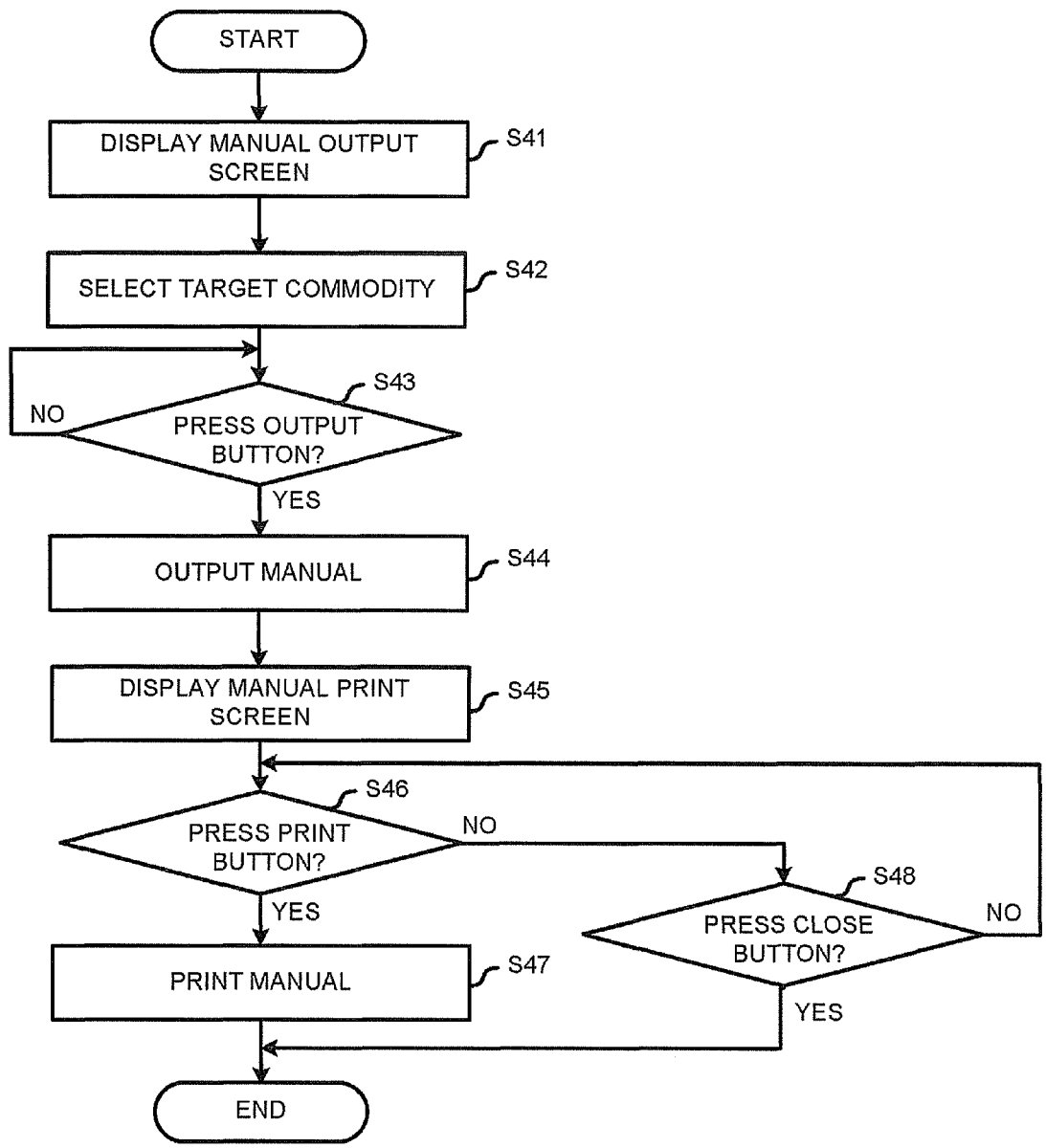
FIG. 12 is a flowchart illustrating a manual output processing.

FIG. 12 is a flowchart illustrating the manual output processing executed by the CPU 61 of the POS terminal 11 according to the object recognition processing program PR.

First, the display control section 95 of the POS terminal 11 displays a manual output screen (not shown) (ACT S41). The manual output screen is used to input operations relating to the output of holding manner manual. In order to designate a target commodity of which the holding manner manual is to be output, the manual output screen displays a list of commodities registered in the adequacy information table T1 and in the in-adequacy information table T2. The manual output screen includes an output button for outputting a holding manner manual of the commodity which is designated.

Next, the input reception section 55 of the POS terminal 11 receives an input for designating a target commodity of which the holding manner manual is to be output (ACT S42).

Next, the manual output section 94 of the POS terminal 11 determines whether or not the press of the output button in the manual output screen is detected (ACT S43). If it is not detected that the output button is pressed (NO in ACT S43), the manual output section 94 of the POS terminal 11 waits for the output of the holding manner manual.

On the other hand, if it is detected that the output button is pressed (YES in ACT S43), the manual output section 94 of the POS terminal 11 outputs the holding manner manual to the HDD 64 (ACT S44). The manual output section 94 may also output the holding manner manual to a storage medium other than the HDD 64.

Figure 13:
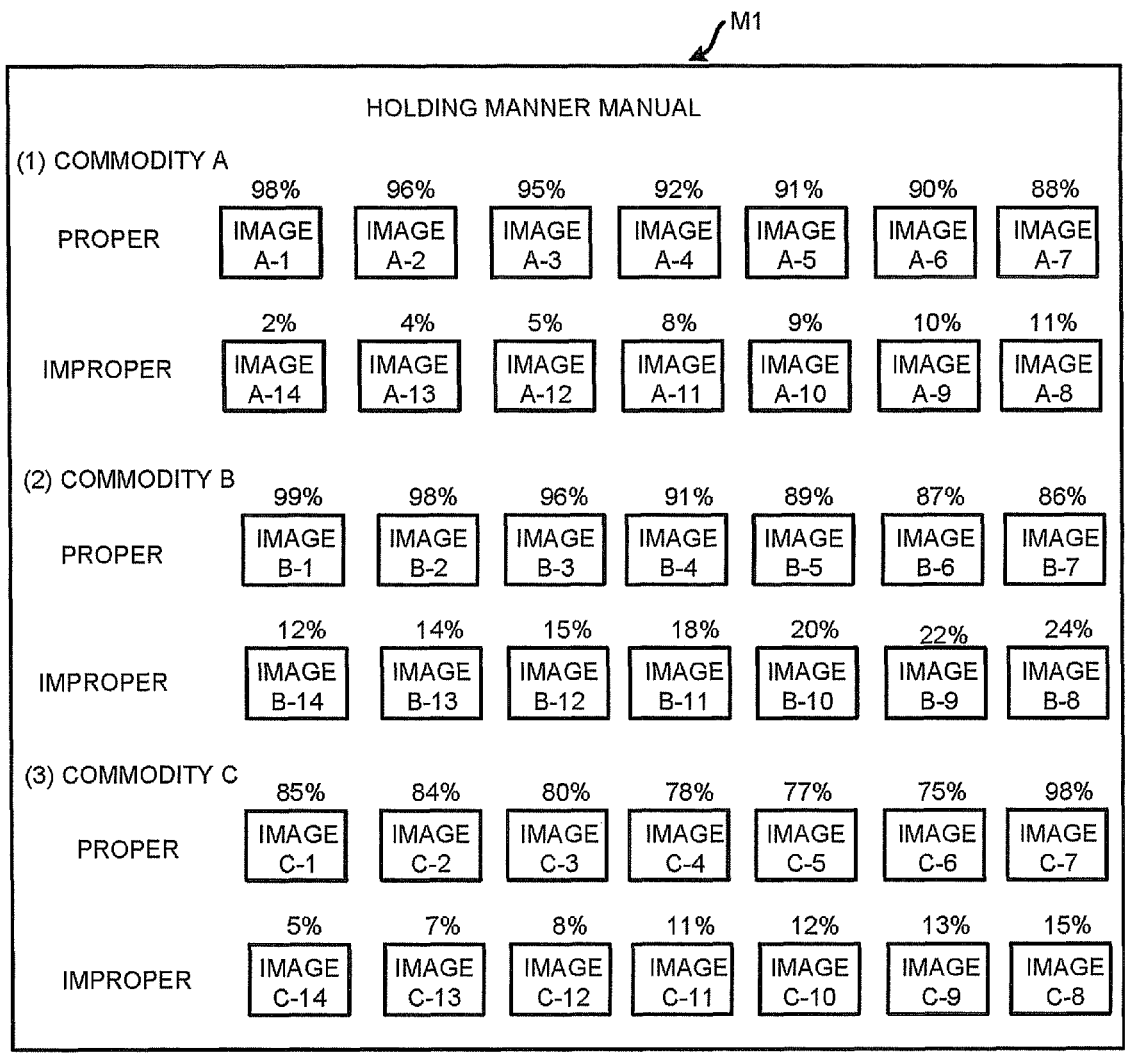
FIG. 13 is a diagram illustrating an example of a holding manner manual.

FIG. 13 is a diagram illustrating an example of a holding manner manual M1. As an example of holding manner of a commodity held over the image capturing section 164, the holding manner manual M1 presents the adequacy information in the adequacy information table T1 and the in-adequacy information in the in-adequacy information table T2 for each commodity. The holding manner manual M1 presents the frame images having high similarity degrees and the frame images having low similarity degrees for each commodity. The holding manner manual M1 further includes information indicating the similarity degrees. The information indicating the similarity degrees in the holding manner manual M1 refers to a word "proper" representing the proper holding manner, a word "improper" representing the improper holding manner and numerals representing the similarity degrees. The holding manner manual M1 shown in FIG. 13 presents 98% for an image A-1 and 2% for an image A-14 as the numerals representing the similarity degrees. Further, the holding manner manual M1 shown in FIG. 13 presents information indicating the similarity degrees for other frame images. With reference to the holding manner manual M1, the operator can learn the proper holding manners of commodities held over the image capturing section 164 and the improper holding manners of commodities held over the image capturing section 164. In the holding manner manual M1 shown in FIG. 13, both the adequacy information and the in-adequacy information are presented for a commodity A, a commodity B and a commodity C. In the holding manner manual M1 shown in FIG. 13, the frame images having high similarity degrees and the frame images having low similarity degrees are presented for each commodity.

Next, the display control section 95 of the POS terminal 11 displays a manual print screen (not shown) (ACT S45). The manual print screen is used to input whether or not the holding manner manual M1 is printed. The manual print screen includes a print button and a close button. The print button is pressed if the holding manner manual M1 is printed. The close button is pressed if the manual print screen is printed without printing the holding manner manual M1.

Next, the input reception section 55 of the POS terminal 11 determines whether or not the press of the print button is detected (ACT S46). If it is detected that the print button is pressed (YES in ACT S46), the print control section 96 of the POS terminal 11 enables the second printer 121 to print the holding manner manual M1 (ACT S47).

If it is determined that the print button is not pressed (NO in ACT S46), the input reception section 55 of the POS terminal 11 determines whether or not the press of the close button on the manual print screen is detected (ACT S48). If it is not detected that the close button on the manual print screen is pressed (NO in ACT S48), the CPU 61 of the POS terminal 11 proceeds to carry out the processing in ACT 46.

On the other hand, If it is determined that the close button on the manual print screen is pressed (YES in ACT S48), the CPU 61 of the POS terminal 11 closes the manual print screen to terminate the manual output processing without printing the holding manner manual M1. In the holding manner manual M1, both the frame images of a commodity captured by the image capturing section 164 in the proper holding manner and the frame images of a commodity captured by the image capturing section 164 in the improper holding manner are presented. Further, the information indicating the similarity degrees is presented in the holding manner manual M1. Thus, the operator can learn the adequacy/in-adequacy of the commodity holding manner with reference to the holding manner manual M1.

As stated above, according to the POS terminal 11 of the present embodiment, the object designation section 91 receives an input for designating a target commodity from the registered commodities stored in the PLU file F1. The similarity degree calculation section 53 compares the feature amount extracted from a frame image captured by the image capturing section 164 with the feature amount of the target commodity stored in the PLU file F1 to calculate a similarity degree therebetween. Then, in a case in which the calculated similarity degree is higher than the similarity degrees stored in the adequacy information table T1, the table updating section 93 stores the captured frame image in the adequacy information table T1. Further, in a case in which the calculated similarity degree is lower than the similarity degrees stored in the in-adequacy information table T2, the table updating section 93 stores the captured frame image in the in-adequacy information table T2. The manual output section 94 outputs the frame images stored in the adequacy information table T1 and the in-adequacy information table T2, and information indicating the similarity degrees thereof. In this way, the operator can refer to frame images on which the proper holding manners of the commodity and the improper holding manners of the commodity held over the image capturing section 164 are output. Consequently, the operator can learn the adequacy/in-adequacy of the commodity holding manner.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

Though it is exemplified in the embodiment described above that the POS terminal 11 includes the PLU file F1, the present invention is not limited to this. For example, the commodity reading apparatus 101 may include the PLU file F1. Alternatively, an external device to which the POS terminal 11 and the commodity reading apparatus 101 are possible to access may include the PLU file F1.

Further, in the embodiment described above, the table updating section 93 determines whether or not the frame image selected by the frame image selection section 92 is registered in the adequacy information table T1 or in the in-adequacy information table T2. However, the table updating section 93 may take all the frame images captured by the image capturing section 164 as the registration candidates, and in this case as long as the image capturing section 164 decreases the frame rate at which the frame images are captured. In this way, it is possible to prevent the frame images similar to one the other from being stored in the adequacy information table T1 or the in-adequacy information table T2.

It is exemplified in the embodiment described above that the POS terminal 11 serving as the information processing apparatus has functions of the image acquisition section 51, the commodity detection section 52, the similarity degree calculation section 53, the similarity degree determination section 54, the input reception section 55, the sales registration section 56, the object designation section 91, the frame image selection section 92, the table updating section 93, the display control section 95, the manual output section 94, the print control section 96 and the communication control section 97. However, the present invention is not limited to this, and an information processing apparatus having the aforementioned functions may be the commodity reading apparatus 101 which outputs the calculation result and determination result to the POS terminal 11. It is exemplified in the embodiment described above that the data for collation is described as the feature amount, however, the data for collation may be a captured commodity image (reference image).

Further, in the embodiment stated above, the checkout system 1, serving as a store system, which comprises the POS terminal 11 and the commodity reading apparatus 101 is used, however, it is not limited to this, and a single apparatus comprising all the functions of the POS terminal 11 and the commodity reading apparatus 101 may also be used. As an apparatus comprising all the functions of the POS terminal 11 and the commodity reading apparatus 101, a self-checkout apparatus (hereinafter referred to as a self-checkout POS) installed and used in a store such as a supermarket and the like is known.

Figure 14:
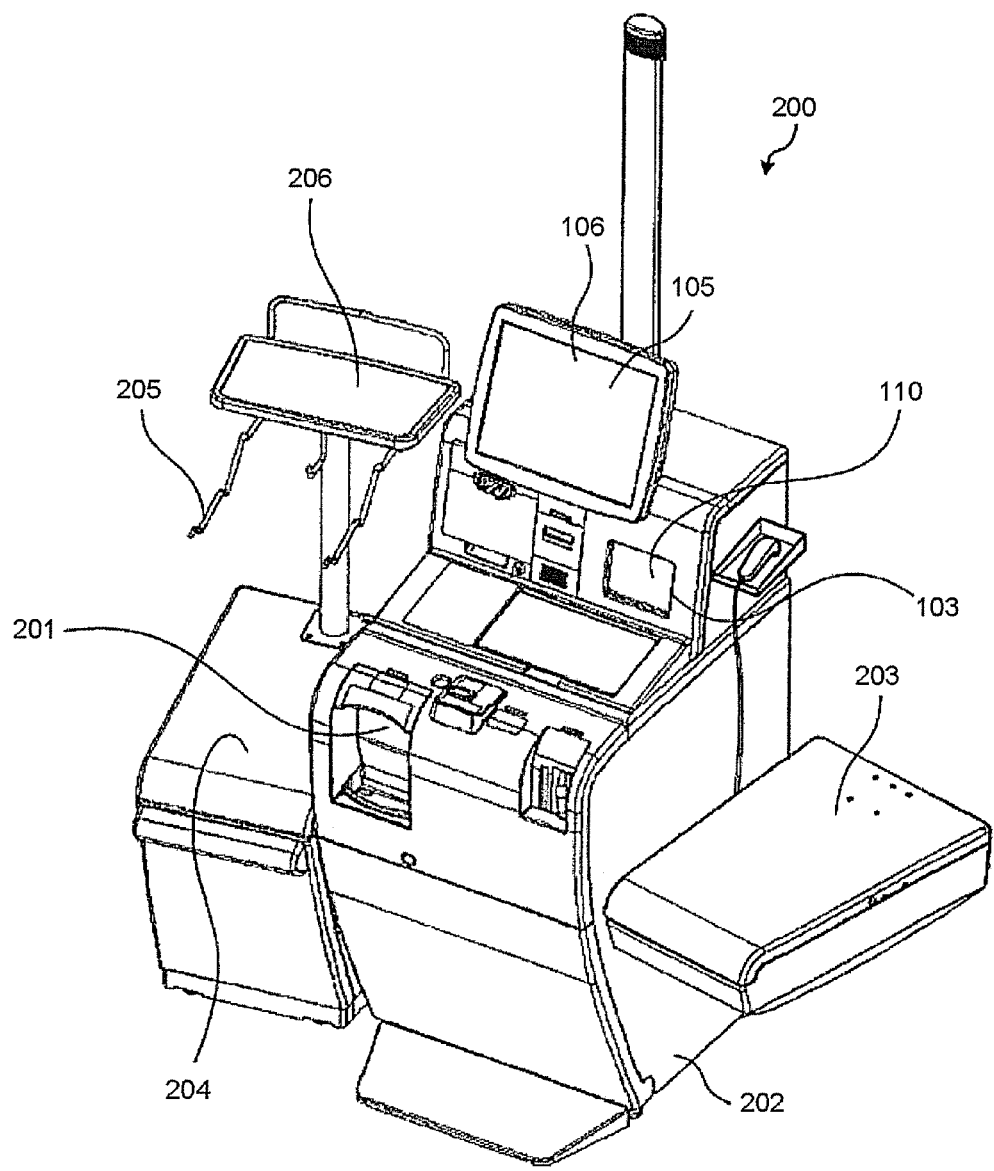
FIG. 14 is a perspective view illustrating the external constitution of the self-checkout POS.
Figure 15:
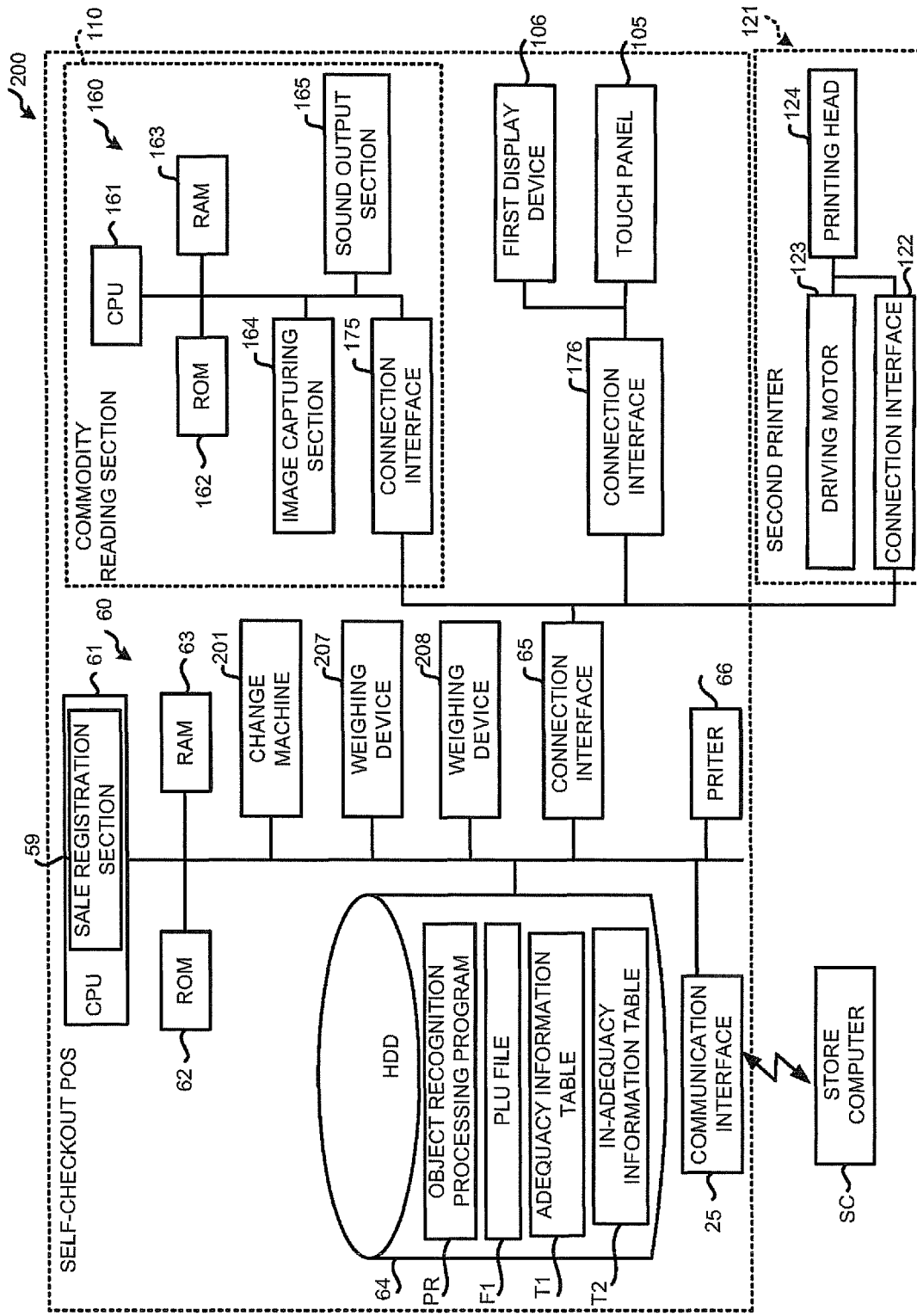
FIG. 15 is a block diagram illustrating the hardware constitution of the self-checkout POS.

FIG. 14 is a perspective view illustrating the external constitution of the self-checkout POS 200, and FIG. 15 is a block diagram illustrating the hardware constitution of the self-checkout POS 200. Hereinafter, the same numerals are applied to the components similar to that in FIG. 1 and FIG. 2, and therefore the detailed descriptions thereof are not repeated. As shown in FIG. 14 and FIG. 15, a main body 202 of the self-checkout POS 200 comprises a first display device 106 having a touch panel 105 on the surface thereof and a commodity reading section 110 which captures a commodity image to recognize (detect) the category of the commodity.

The first display device 106 may be, for example, a liquid crystal display. The first display device 106 displays, for example, a guidance screen, various input screens, a sales registration screen, and a settlement screen. The guidance screen is used for providing customers with a guidance for the operation of the self-checkout POS 200. Various input screens are used to input various kinds of information. The sales registration screen is used for displaying the commodity information read by the commodity reading section 110, and the settlement screen is used to display a total amount of the commodities, a deposit amount and a change amount, and to select a payment method.

The commodity reading section 110 captures a commodity image through the image capturing section 164 when the customer holds the code symbol attached to the commodity over the reading window 103 of the commodity reading section 110.

Further, the main body 202 includes a commodity placing table 203 for placing a shopping basket (unsettled basket) in which an unsettled commodity is put at the right side of the main body 202, and another commodity placing table 204 for placing a shopping basket (settled basket) in which a settled commodity is put after the sales registration thereof is executed at the left side of the main body 202. The commodity placing table 204 also includes a bag hook 205 for hooking a bag for placing the settled commodities therein and a temporary placing table 206 for placing the settled commodities temporarily before the settled commodities are put into a bag. The commodity placing tables 203 and 204 are equipped with weighing scales 207 and 208 respectively, and are therefore capable of confirming whether or not the weight of commodity (commodity taken out of the unsettled basket and commodity put into the settled basket) is the same before and after a settlement of the commodity is executed.

Further, a change machine 201 for receiving bill for settlement and discharging bill as change is arranged in the main body 202 of the self-checkout POS 200.

In a case in which the self-checkout POS 200 having such constitutions as described above is applied to the store system, the self-checkout POS 200 functions as an information processing apparatus.

Further, in the embodiment and modifications described above, the programs executed by each apparatus are pre-installed in the storage medium (ROM or storage section) of each apparatus, however, the present invention is not limited to this. For example, the programs may be recorded in a computer-readable recording medium such as CD-ROM, flexible disk (FD), CD-R, DVD (Digital Versatile Disk) in the form of installable or executable file. Further, the storage medium, which is not limited to a medium independent from a computer or an incorporated system, further includes a storage medium for storing or temporarily storing the downloaded program transferred via an LAN or the Internet.

In addition, the programs executed by each apparatus described in the embodiment and modifications above may be stored in a computer connected with a network such as the Internet to be provided through a network download or provided and distributed via a network such as the Internet.

What is claimed is:

1. A holding manner learning apparatus, comprising:
a storage part that stores information; and
a hardware processor that is communicatively coupled to the storage part and that functions as:
a designating module configured to designate a target object from a storage in which a feature amount for recognizing an object is stored for each object;
an acquisition module configured to acquire an image captured by photographing an object that is held over an image capturing section with the image capturing section;
a calculation module configured to calculate a similarity degree between the feature amount of the object contained in the image acquired by the acquisition module and the feature amount of the target object designated by the designating module;
a storing module configured to store the image acquired by the acquisition module and the similarity degree calculated by the calculation module in an adequacy information table or an in-adequacy information table according to the similarity degree calculated, the image acquired by the acquisition module and the similarity degree of the object contained in the image being stored in an associated manner; and
an output module configured to output an electronic file that presents at least one of information including each of the image and the similarity degree stored in the adequacy information table by the storing module as information for indicating a proper holding manner or information including each of the image and the similarity degree stored in the in-adequacy information table by the storing module as information for indicating an improper holding manner.

2. The holding manner learning apparatus according to claim 1, further comprising a printing section, wherein the output module enables the printing section to print the electronic file.

3. The holding manner learning apparatus according to claim 1, further comprising a display section, wherein the output module enables the display section to display the electronic file.

4. A holding manner learning system, comprising:
a storage part that stores information; and
a hardware processor that is communicatively coupled to the storage part and that functions as:
a designating module configured to designate a target object from a storage in which a feature amount for recognizing an object is stored for each object;
an acquisition module configured to acquire an image captured by photographing an object that is held over an image capturing section with the image capturing section;
a calculation module configured to calculate a similarity degree between the feature amount of the object contained in the image acquired by the acquisition module and the feature amount of the target object designated by the designating module;
a storing module configured to store the image acquired by the acquisition module and the similarity degree calculated by the calculation module in an adequacy information table or an in-adequacy information table according to the similarity degree calculated, the image acquired by the acquisition module and the similarity degree of the object contained in the image being stored in an associated manner;
an output module configured to output an electronic file that presents at least one of information including each of the image and the similarity degree stored in the adequacy information table by the storing module as information for indicating a proper holding manner or information including each the image and the similarity degree stored in the in-adequacy information table by the storing module as information for indicating an improper holding manner; and
a sales registration module configured to recognize a commodity that is the object captured by the image capturing section using the feature amount for recognizing the object to execute a sales registration processing.

5. A holding manner learning method, comprising:
designating a target object from a storage in which a feature amount for recognizing an object is stored for each object;
acquiring an image captured by photographing an object that is held over an image capturing section with the image capturing section;
calculating a similarity degree between the feature amount of the object contained in the acquired image and the feature amount of the designated target object;
storing the image acquired and the similarity degree calculated in an adequacy information table or an in-adequacy information table according to the similarity degree calculated, the image acquired and the similarity degree of the object contained in the image being stored in an associated manner; and
outputting an electronic file that presents at least one of information including each the image and the similarity degree stored in the adequacy information table as information for indicating a proper holding manner or information including each the image and the similarity degree stored in the in-adequacy information table as information for indicating an improper holding manner.

* * * * *